Sept. 8, 1953  R. A. GROUSE  2,651,100
MANUFACTURE OF ELECTRICAL CAPACITORS
Filed May 23, 1949
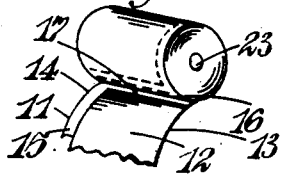
Fig. 1.
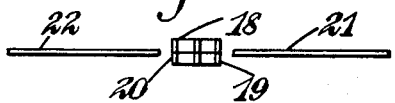
Fig. 2.
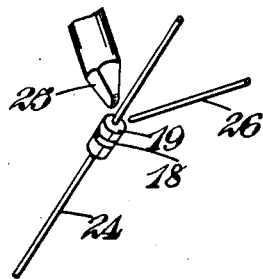
Fig. 3.
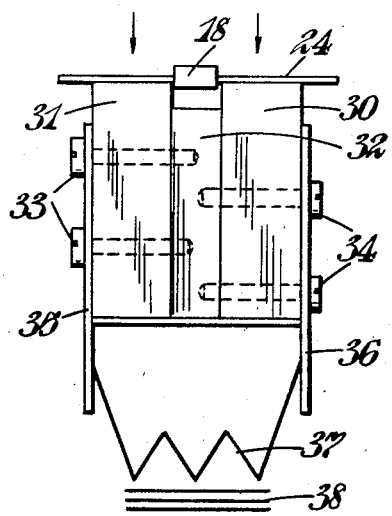
Fig. 4.
Fig. 5.
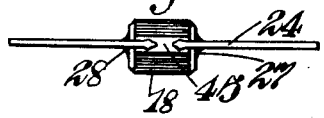
Fig. 6.
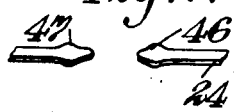
Fig. 7.
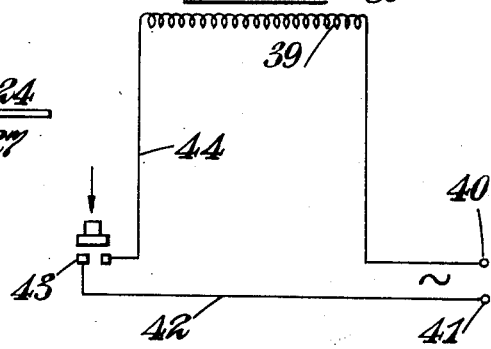
INVENTOR
Richard A. Grouse
By Watson, Cole, Grindle & Watson Patented Sept. 8, 1953

2,651,100

UNITED STATES PATENT OFFICE 2,651,100

MANUFACTURE OF ELECTRICAL CAPACITORS

Richard Alfred Grouse, London, England, assignor to A. H. Hunt (Capacitors) Limited, London, England, a British company Application May 23, 1949, Serial No. 94,861
In Great Britain April 29, 1949

2 Claims. (Cl. 29—25.42)

This invention comprises improvements in or relating to the manufacture of electrical capacitors.

It is an object of the invention to deal with the manufacture of small capacitors of the type which is made by rolling metallised paper into the form of a roll and soldering terminal wires to the two ends of the roll. When very small capacitors of this kind are made, difficulty is found in soldering the terminal wires in place because unless a special jig is made to hold the capacitor and the terminal wire, it is difficult to ensure that the wire is truly co-axial with the capacitor. The insertion of very small units comprising not only the capacitor but also two separate terminal wires in a jig occupies too much time. Although particularly useful in dealing with these capacitors of very small sizes, the invention is also of value in dealing with larger capacitors of the type which is made from metallised paper or foil and paper wound into a roll.

According to the present invention, a process for the manufacture of electrical capacitors comprises the steps of winding the capacitor in the form of a roll of insulation and electrodes with one pole of the capacitor exposed at one end and the other pole at the other end of the roll, spraying the ends of the roll with metal, inserting a terminal wire through the centre of the roll so that it projects at both ends, soldering the terminal wire to the sprayed metal at each end of the roll and thereafter passing such a current through the terminal wire as to fuse it within the capacitor and separate the two ends of the wire from each other. Further details of the invention will be apparent from the following description which is given, by way of example, of one method of carrying the invention into effect.

Referring to the accompanying drawing:

Figure 1 is a perspective view of a capacitor roll;

Figure 2 is a diagram showing the parts in the position for assembling by the methods heretofore usual;

Figure 3 is a diagram of a soldering operation according to the present invention;

Figure 4 is a diagram of connections;

Figure 5 is a longitudinal section through a capacitor which has been assembled and soldered as shown in Figure 3;

Figure 6 is a similar view after the terminal wires have been separated in the apparatus of Figure 4, and Figure 7 is an enlarged view of the ends of the fused terminal wires.

Wound-roll, paper-insulated, electrical capacitors can be produced in various ways. Two strips of paper interleaved with strips of metal foil can be wound together with the metal foil corresponding to one electrode projecting from the paper at one end and that corresponding to the other electrode projecting at the other end of the roll. Alternatively, two strips of metallised paper can be wound together with the metallisation of one strip acting as one electrode and extending up to one edge of the strip, while the metallisation on the other strip acts as the other electrode and extends up to the opposite edge thereof. When the two strips are wound together, the metallisation of the one electrode is accessible to spraying with metal from a spraygun at one end of the roll, while the metal on the other paper strip which constitutes the other electrode is accessible to spraying at the opposite end of the roll. In order to improve the accessibility, the edges of the paper strips are sometimes turned over along the margin with the metallisation on the outside of the turn-over. Again in United States patent application No. 70,237, now Patent No. 2,637,766, granted May 5, 1953, there is described a form of wound roll paper capacitor which is made from a single strip of metallised paper having alternate areas of metallisation spread out along its length which form, when the roll is wound, opposite portions of the capacitor. The roll illustrated in Figure 1 of the drawing is of the latter kind and on this roll, which is wound from a single paper strip 11, metallised areas 12 occur which extend up to the edge 13 of the roll and are separated from the opposite edge 14 by a narrow demetallised margin 15. These metallised areas are separated from adjacent metallised areas 16 on the roll by a demetallised transverse margin 17 and the metallised areas 16 extend up to the edge 14 but are separated from the edge 13 by a demetallised strip. The metallised areas are made long enough to each form approximately a complete turn around the roll and in the result, a capacitor is formed from a single strip of metallised paper which has all the areas 12 extending up to and exposed at the edge 13 and all the areas 16 extending up to and exposed at the edge 14 which, in the wound capacitor, becomes one end of the roll in contrast to the edge 13 which becomes the other end thereof. This method of winding a capacitor from a single strip of paper permits the manufacture of extremely minute rolls for capacitors of minute electrical capacity. Such capacitors are very difficult to assemble with terminal wires.

Figure 2 shows a capacitor 18 approximately full size. Such a capacitor may be only one quarter of an inch long and one eighth of an inch in diameter. The roll is sprayed with copper from a spray-gun at 19 on one end and 20 on the other end and the problem is to solder a terminal wire 21 to the sprayed metal 19 and a terminal wire 22 to the sprayed metal 20. Owing to the minuteness of the parts, the operator has difficulty in handling them without the risk of burning the fingers, and if a jig is employed, considerable time is taken by the operator in arranging the parts 18, 21, 22 in the jig.

Every capacitor which is wound into a roll is normally wound on a mandrel and therefore there is an aperture 23 (Figure 1) through the centre of the capacitor after it has been taken off the mandrel. When the metal is sprayed on the ends of the roll at 19 and 20, the aperture 23 is not filled up and according to the present invention, instead of using two separate terminal wires 21 and 22, as shown in Figure 2 of the drawing, a single long terminal wire 24 (Figure 3) is pushed through the centre of the roll so that it projects at both ends. The roll 18, shown in Figure 3, is similar to the roll 18 of Figure 2 with metal sprayed at both ends and the long terminal wire 22 permits the operator to grasp the assembly at a considerable distance from the soldering iron 25. If the soldering iron 25 is held in a clamp, the operator can hold the wire 24 in one hand and a stick of cored solder 26 in the other hand and touch the parts together so that the sprayed metal 19 is united to the terminal wire 24 without the least difficulty and without having to provide any jig for holding the wire 24 concentric with the roll 18. He can then reverse the capacitor, holding it by the other end of the wire 24 and solder the wire at the other end of the capacitor to the sprayed metal there. At this stage the whole unit will take the form which is shown in longitudinal section at Figure 5 where the wire 24 is soldered to the sprayed metal 19 and 20 by the solder fillets 27, 28. In this condition, the capacitor is useless because its two ends are short-circuited together by the wire 24 passing through the centre of it.

According to the present invention, the capacitor in the state shown in Figure 5 of the drawing is then taken and placed, as shown in Figure 4, on the top of two copper blocks 30, 31 which are separated from one another by an insulating block 32, sufficient space being allowed between the blocks 30, 31 for accommodation of the capacitor roll 18. The blocks 30, 31 are secured to the insulating block 32 by means of screws 33, 34 and under the heads of the screws 33, 34 there are secured stout copper conducting strips 35, 36 which are electrically connected to a low voltage secondary winding 37 of a step-down transformer, of which the core is indicated at 38 and the primary winding at 39. The primary winding is connected to terminals 40, 41 of an alternating current electricity supply and in the line 42 from the terminal 41 there is inserted a foot switch 43 which, when depressed, is capable of connecting the supply through line 44 to the primary winding 39. The operator takes the capacitor, as shown in Figure 5, and lays it with its terminal wire 24 resting upon the top of the blocks 30, 31 and presses it down firmly with the fingers upon the top of the copper blocks. He then depresses the foot switch. The transformer is designed to give a voltage of about 1½ volts at the copper blocks 30, 31 and this is sufficient to pass a current through the terminal wire which will cause it to fuse within the capacitor roll 18. The wire does not become heated appreciably in the outer portion where it is resting upon the copper blocks because any heat is conveyed away into the blocks, which have a considerable heat storage capacity, but it rapidly becomes heated to fusing point within the capacitor roll 18 because there it is shielded from radiation. As a result, the two ends of the terminal wire become separated by a gap as shown at 45 (Figure 6) and the capacitor is thus provided with two separate terminal wires and is no longer short-circuited.

The fusing current between the blocks 30, 31 may be sufficient momentarily to soften the solder fillets 27, 28 but the solder here immediately rehardens owing to the cooling effect of the end portions of the wire 24 which are in contact with the copper blocks 30, 31, and the operator does not need to keep the capacitor in contact with the blocks longer than is necessary to allow the folder fillets to resume their solid condition.

When fusion occurs at 45, the ends of the wires retreat from one another, forming globules of molten metal 46, 47 upon their ends, as shown to an enlarged scale in Figure 7 of the drawing. This ensures that there will be a substantial gap at 45 and not merely a minute break in continuity.

The actual amount of heat liberated by fusion of the wire 24 is very small and only one or two of the innermost turns of the paper winding of the roll can be affected by it. In order to ensure that the electrical qualities of the capacitor roll are not affected in any way by the operation, it is desirable that the first dozen turns of paper in the roll should be of blank, that is to say unmetallised, paper. The paper on which these capacitors are wound is extremely thin, about 0.0005 of an inch in thickness and therefore the presence of a dozen turns of unmetallised paper in the centre of the roll does not appreciably affect the capacity of the whole unit.

In a typical case, a metallised paper capacitor was produced having a roll of one eighth of an inch diameter and one quarter of an inch long. The aperture 23 through the centre of the capacitor was 0.040 of an inch diameter. The ends of the roll were sprayed with copper from a spray-gun and then a wire 24 of tinned copper of a diameter of 0.0148 of an inch was passed through the centre. The voltage between the blocks 30, 31 was 1.5 volts. Fusion of the wire 24 through the centre of the capacitor was substantially instantaneous. The insulation resistance of the completed capacitor from the one terminal to the other end, testing at 500 volts, was more than one million megohms.

Larger capacitors can be dealt with in the same way with equal ease.

I claim:

1. A process for attaching terminal wires to a roll capacitor which has some of its electrodes extending to one end of the roll and some to the other end, comprising spraying the ends of the roll with metal, inserting a terminal wire through the center of the roll so that it projects at both ends, soldering the terminal wire to the sprayed metal at each end of the roll and thereafter passing a current sufficient to fuse the terminal wire within the capacitor while keeping the ends of the wire external to the capacitor below fusion temperature by conduction of heat therefrom.

2. A process for attaching terminal wires to a roll capacitor which has some of its electrodes extending to one end of the roll and some to the other end, comprising spraying the ends of the roll with metal, inserting a terminal wire through the centre of the roll so that it projects at both ends, soldering the terminal wire to the sprayed metal at each end of the roll and thereafter passing an alternating current transformed down to about 1½ volts through the terminal wire to fuse it within the capacitor while keeping the ends of the wire external to the capacitor below fusion temperature by conduction of heat therefrom.

RICHARD ALFRED GROUSE.

References Cited in the file of this patent

UNITED STATES PATENTS

| Number | Name | Date |
| --- | --- | --- |
| 2,388,139 | Grouse et al. | Oct. 30, 1945 |
| 2,399,466 | Carlson et al. | Apr. 30, 1946 |
| 2,450,197 | Ishler | Sept. 28, 1948 |